(12) United States Patent
Hue et al.

(10) Patent No.: US 10,081,229 B2
(45) Date of Patent: Sep. 25, 2018

(54) VEHICLE DRIVING AID SYSTEM FOR REDUCING LIGHT CONTRAST

(71) Applicant: VALEO VISION, Bobigny (FR)

(72) Inventors: David Hue, Bobigny (FR); Hafid El Idrissi, Bobigny (FR)

(73) Assignee: VALEO VISION, Bobigny (FR)

( * ) Notice: Subject to any disclaimer, the term of this patent is extended or adjusted under 35 U.S.C. 154(b) by 0 days.

(21) Appl. No.: 15/531,261

(22) PCT Filed: Nov. 24, 2015

(86) PCT No.: PCT/EP2015/077497
§ 371 (c)(1),
(2) Date: May 26, 2017

(87) PCT Pub. No.: WO2016/083371
PCT Pub. Date: Jun. 2, 2016

(65) Prior Publication Data
US 2017/0361688 A1 Dec. 21, 2017

(30) Foreign Application Priority Data

Nov. 27, 2014 (FR) ...................................... 14 61605

(51) Int. Cl.
*B60J 3/04* (2006.01)
*B60Q 1/14* (2006.01)
*G02F 1/137* (2006.01)

(52) U.S. Cl.
CPC ............... *B60J 3/04* (2013.01); *B60Q 1/143* (2013.01); *G02F 1/137* (2013.01); *B60Q 2300/42* (2013.01)

(58) Field of Classification Search
CPC .... H05B 37/02; H05B 37/0236; B60Q 1/143; B60Q 1/085; B60Q 2300/31;
(Continued)

(56) References Cited

U.S. PATENT DOCUMENTS

2015/0042226 A1* 2/2015 Hibino ................... B60Q 1/085
315/82
2015/0062469 A1 3/2015 Fleury
(Continued)

FOREIGN PATENT DOCUMENTS

EP 2415638 A2 2/2012
EP 2415638 A3 2/2012
(Continued)

OTHER PUBLICATIONS

International Search Report dated Feb. 5, 2016, in PCT/EP2015/077497, filed Nov. 24, 2015.
(Continued)

*Primary Examiner* — Jimmy Vu
(74) *Attorney, Agent, or Firm* — Oblon, McClelland, Maier & Neustadt, L.L.P.

(57) ABSTRACT

The present invention relates to a motor vehicle driving aid system, the vehicle comprising a lighting device intended to illuminate a road scene at the front of the vehicle. The vehicle includes means for detecting an oncoming vehicle, control means receiving information from the detection means, and means for reducing dazzling of the driver of the motor vehicle caused by the light emitted by the oncoming vehicle. These means are controlled by the control means, and means for the management of the lighting device designed to increase the illumination of the lighting device of the vehicle and to avoid dazzling of the driver of the oncoming vehicle, these means being controlled by the control means.

20 Claims, 2 Drawing Sheets

(58) Field of Classification Search
CPC ........ B60Q 2300/42; B60J 3/04; F21V 23/03;
F21V 25/12; F21L 14/026; G02F 1/137
USPC ....... 315/77, 82, 151, 209 R, 291, 294, 307,
315/308, 312
See application file for complete search history.

(56) References Cited

U.S. PATENT DOCUMENTS

2015/0088385 A1    3/2015  Fleury
2016/0167566 A1*  6/2016  Tanaka ................ F21S 48/1747
315/82

FOREIGN PATENT DOCUMENTS

| FR | 2988333 A1 | 9/2013 |
| FR | 2988493 A1 | 9/2013 |
| WO | 2011/105987 A1 | 9/2011 |

OTHER PUBLICATIONS

French Search Report dated Jul. 28, 2015, in French Patent Application No. 1461605, filed Nov. 27, 2014.

* cited by examiner

VEHICLE DRIVING AID SYSTEM FOR REDUCING LIGHT CONTRAST

BACKGROUND OF THE INVENTION

Field of the Invention

The invention relates to a motor vehicle driving aid system.

The present invention relates to systems intended to provide an aid to the driving of motor vehicles, particularly when exterior light levels are low and require headlights to be turned on.

Description of the Related Art

The light beams emitted by the lighting devices that equip the vehicles are governed by national and international regulations that set maximum and minimum intensities to be complied with, for example on a screen placed at a distance and in the axis of the lighting device. The aim of these regulations is simultaneously to:

provide the driver of the vehicle equipped with this lighting device with satisfactory illumination of the road scene where he is driving, in order that he can understand his environment under optimum conditions; and prevent dazzling of the drivers of other vehicles driving in the opposite direction (oncoming vehicles).

Notwithstanding these regulations, it is nevertheless frequently the case that the driver of a vehicle is dazzled by the lighting devices of oncoming vehicles that are, for example, either poorly adjusted, or illuminate differently from the norm owing to a heavy load at the rear of the vehicle, or on account of weather conditions (rain, snow, etc.). This dazzling causes the driver's eye to adapt by means of retraction of the pupil of the eye so as to reduce the light perceived. This adaptation to dazzling is accompanied by a general drop in the perceived light level throughout the visual field. Thus, the peripheral zones of the dazzle zone, where there may be elements likely to create hazardous situations, such as obstacles or pedestrians on the road or the roadside, are less visible to the driver. Therefore, owing to this significant contrast between the dazzle zone and the peripheral zones, the lighting devices of the vehicle may be insufficient for satisfactory visibility in these peripheral zones. Furthermore, increasing the light level of the lighting devices in order sufficiently to reduce this contrast cannot be envisaged since this light level is itself limited so as not to dazzle the driver of the oncoming vehicle.

BRIEF SUMMARY OF THE INVENTION

The invention aims to mitigate at least some of the drawbacks of known driving aid systems.

In particular, the invention aims also to provide, in at least one embodiment of the invention, a motor vehicle driving aid system that makes it possible to reduce the contrast in light level in the event of dazzling by an oncoming vehicle. It is understood that the term "oncoming vehicle" used below covers the case of an oncoming vehicle, i.e. a vehicle moving in the opposite direction from the equipped vehicle of the invention, but it also covers the case of a followed vehicle, i.e. a vehicle moving in the same direction as the equipped vehicle of the invention. In this latter case, the invention makes it possible to limit the contrast in light level generated by the rear signaling device of a followed vehicle.

To that end, the invention relates to a motor vehicle driving aid system, the vehicle comprising a lighting device, intended to illuminate a road scene at the front of the vehicle, the vehicle comprising means for detecting an oncoming vehicle, the aid system being characterized in that it comprises:

control means receiving information from the detection means, means for reducing dazzling of the driver of the motor vehicle caused by the light emitted by the oncoming vehicle, these means being controlled by the control means, means for managing the lighting device designed to increase the illumination of the lighting device of the vehicle and to avoid dazzling of the driver of the oncoming vehicle, these means being controlled by the control means.

A driving aid system according to the invention thus makes it possible, in the event of dazzling by a vehicle traveling in the opposite direction or in the same direction, to reduce the contrast between the illumination of said oncoming vehicle and the illumination of the vehicle equipped with the aid system according to the invention. Thus, the vehicle driver sees the illuminated zone close to and around the oncoming vehicle, where there may be obstacles, pedestrians or other elements likely to give rise to a hazardous situation better.

Advantageously, and according to the invention, the lighting device is controlled by a pulsed signal generated by the control means, and in that the means for reducing dazzling comprise at least one means equipped with obturators controlled by said pulsed signal in synchronization with the lighting device.

In such a situation, the means equipped with obturators is a pair of spectacles and/or a windshield of said vehicle and/or a sun visor, in particular a removable sun visor, of said vehicle.

According to this aspect of the invention, the obturators function in synchronization with the lighting device by virtue of a pulsed signal controlling at a high level the switching-on of the lighting device and the opening of the obturators and, at a low level, the switching-off of the lighting device and the closure of the obturators. This results in illumination in accordance with diverse legislation governing mean illumination while reducing the dazzling of the driver of the vehicle thanks to the periodical closure of the obturator.

Advantageously, and according to this latter aspect of the invention, the obturators comprise liquid crystals, the orientation of which is modified by the pulsed signal.

According to this aspect of the invention, the liquid crystals allow high-speed rocking between an orientation that allows the passage of the light (transparency of lenses in the case of the pair of spectacles) and an orientation that prevents the passage of light (opacity of the lenses in the case of the pair of spectacles), corresponding, respectively, to open and closed obturators.

Advantageously, and according to the invention, the detection means are designed to detect the presence and the position of one or more oncoming vehicles, the control means adapting the illumination zone as a function of said presence and position of the oncoming vehicle so as not to dazzle the driver of the oncoming vehicle.

According to this aspect of the invention, the information from the detection means allow the central control unit to define the zone or zones where the one or more oncoming vehicles is or are located and to adapt the illumination of its lighting device so as not to dazzle the one or more drivers of the one or more oncoming vehicles.

Advantageously, and according to the invention, the detection means comprise a camera facing outward and toward the front of the vehicle.

Advantageously, and according to the invention, in the illumination zone, illumination is minimized in a sub-zone where the oncoming vehicle is located.

According to this aspect of the invention, the illumination does not dazzle the driver of the oncoming vehicle and remains in compliance with diverse legislation.

Advantageously, and according to the invention, in the illumination zone, illumination is increased outside a sub-zone where the oncoming vehicle is located.

According to this aspect of the invention, the lighting device makes it possible to achieve significant illumination outside the zone where the oncoming vehicle is located, in such a manner that the illumination outside the zone where the oncoming vehicle is located is close to the illumination obtained when the lighting device is in the lighting mode known as high beam or, commonly, full beam.

The invention also relates to an aid system characterized, in combination, by all or some of the features mentioned above or below.

It will be noted that the lighting device comprises at least one light source of electroluminescent diode type, in particular a laser diode.

Lastly, the invention covers a motor vehicle comprising a lighting device intended to illuminate a road scene at the front of the vehicle, means for detecting an oncoming vehicle, and a driving aid system as defined alone or in combination above.

BRIEF DESCRIPTION OF THE SEVERAL VIEWS OF THE DRAWINGS

Other objects, features and advantages of the invention will become apparent upon reading the following description, which is given purely without limitation and relates to the appended figures, in which.

DETAILED DESCRIPTION OF THE INVENTION

The following embodiments are examples. Although the description relates to one or more embodiments, this does not necessarily mean that each reference relates to the same embodiment or that the features apply only to a single embodiment. Simple features of different embodiments may likewise be combined to provide other embodiments.

Figure 1:
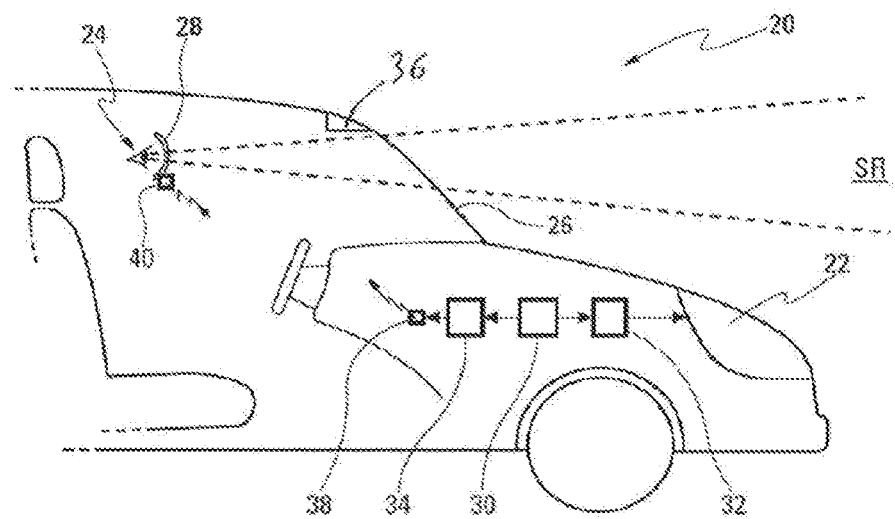
FIG. 1 is a diagrammatic view in partial section of a vehicle equipped with a driving aid system according to an embodiment of the invention.

FIG. 1 schematically shows in partial section a vehicle 20 comprising an aid system according to an embodiment of the invention. The vehicle 20 is equipped in a conventional manner with a lighting device 22 capable of emitting a beam to illuminate a road scene SR, using a light source, and is controlled by a driver, symbolized by his eye 24. The road scene corresponds to what the driver 24 of the vehicle 20 sees. The driver 24 in this case sees the road scene in front of the vehicle 20 through the windshield 26.

The lighting device 22 is managed by means 32 for managing the lighting device 22, which may, for example, be a computer, a microcontroller, etc.

Furthermore, the aid system comprises means for reducing dazzling of the driver 24, comprising, in this embodiment:
- a module 34 for managing means for reducing dazzling,
- an emitter 38, adapted to transmit, via a wireless communication protocol, data relating to the reduction of dazzling,
- spectacles 28, the lenses of which are provided with obturators and receive data relating to the reduction of dazzling via a receiver 40.

The means for reducing dazzling and the means 32 for managing the lighting device 22 are controlled by control means, for example a central unit formed by a microcontroller, hereinafter called control central unit 30. Alternately, the control means take the form of a set of decentralized processing modules. The control central unit 30 allows the transmission of data and commands relating to the reduction of dazzling and to the increase in illumination of the lighting device 22.

The means for reducing dazzling may be a pair of spectacles, as mentioned above. The invention, however, is not limited to this embodiment, since the means provided with obturators may have the form of a windshield equipping the vehicle or, alternately, a removable sun visor installed in the vehicle cabin.

The control central unit 30 receives, in particular, information from the detection means, for example a camera 36, placed, for example, on the windshield 26 at the level of the interior rear-view mirror and directed toward the road scene. This information, in particular video images, enables the central unit 30 to determine an illumination benchmark for the lighting device 22 of the vehicle 20. In particular, the illumination benchmark determines a plurality of parameters, including, in particular, the illumination zone, the illumination intensity and the reduction of dazzling of the driver by the means for reducing dazzling.

The illumination benchmark is, in particular, linked to the detection, in particular via the camera 36, of the presence and of the position of one or more vehicles, called oncoming vehicles, traveling in the direction that is the opposite of the direction of movement of the vehicle 20. The presence and the position of an oncoming vehicle make it possible, in particular, to define the following elements:
- the size and the contours of the illumination zone of the vehicle 20, and also the intensity thereof, illumination being adapted so as not to dazzle the driver of the oncoming vehicle, in accordance with the legislation in force. The result of a benchmark applying these latter parameters is described in greater detail below in the description, with reference to FIG. 2;
- the reduction in dazzling of the driver, which is preferably set up by the means for reducing dazzling only in the event of actual dazzling. This actual dazzling is detected by the camera 36 and/or by other light level or dazzling sensors placed at other locations on the vehicle 20. Alternately, the reduction in dazzling may be set up permanently, by way of a prevention measure, in which case the presence or otherwise of an oncoming vehicle is of no significance.

The other parameters determined by the illumination benchmark are linked to the reduction in dazzling by the means for reducing dazzling, set up by synchronization between a pulsed illumination and an alternating functioning of the obturators of the spectacles 28.

The pulsed illumination is illumination of an intensity that varies between a high value and a low value (close to zero, i.e. extinguished illumination) and of a mean value below or equal to the maximum illumination value authorized by the legislation in force for continuous illumination. The intensity of the illumination being thus regulated as a function of the presence or otherwise of an oncoming vehicle, these high and low values are values around which the intensity may vary from one illumination zone to another in order to take account of this regulation owing to the presence of an oncoming vehicle.

The obturators of the spectacles 28 covering the lenses make it possible to vary, alternately, between a high transmission coefficient (i.e. the closest possible to total transparency of the lenses, windshield or sun visor) and a low transmission coefficient (i.e. the closest possible to total opacity of the lenses, windshield or sun visor). In this embodiment, the obturators are liquid crystals, the orientation of which makes it possible to vary the transmission coefficient.

Synchronization between the pulsed illumination and the obturators arises by virtue of a pulsed signal S. The pulsed signal S is a periodic alternating signal varying between a high level and a low level. During each period of duration T, the pulsed signal S is at the high level for a time t and at the low level for the remaining time in the period, i.e. T-t. The cyclic relationship of the pulsed signal S is defined by the value $\alpha=t/T$.

In this embodiment, the pulsed signal S is generated by the control central unit 30, then transmitted to the module 34 for managing the means for reducing dazzling on the one hand and to the means 32 for managing the lighting device 22 on the other. The means for managing the lighting device 22 use this command to generate the illumination benchmark transmitted to the lighting device 22. The module 34 for managing the reduction means transmits the pulsed signal S to the spectacles 28 via the emitter 38. This pulsed signal S is received by the receiver 40 and allows the control of the obturators. Furthermore, the means 32 for managing the lighting device 22 apply the pulsed signal S to vary the value of the intensity of the illumination of the lighting device 22. An embodiment of the pulsed signal S is described below in the description, with reference to FIG. 3.

By way of example, an embodiment of the synchronized control, by the pulsed signal, of the lighting device and the spectacles with obturators is described in patent application FR2988 493.

Figure 2:
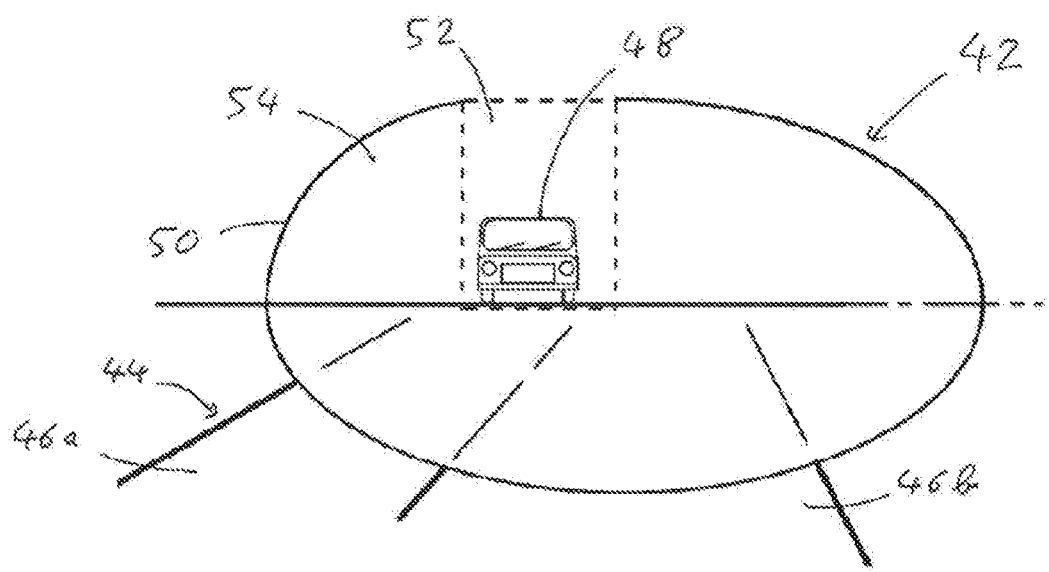
FIG. 2 is a schematic view of the illumination zone of a lighting device of a vehicle equipped with a driving aid system according to an embodiment of the invention.

FIG. 2 schematically shows an illumination zone 42 of the lighting device 22 of the vehicle 20 equipped with a driving aid system according to an embodiment of the invention. The illumination zone 42 is represented on the road scene SR, i.e. that which the driver 24 or the camera 36 observes from the vehicle 20 through the windshield 26. The road scene comprises, in particular, in this case, a road 44 with two lanes 46*a*, 46*b*. The vehicle 20 is traveling in a lane 46*b* and the oncoming vehicle 48 is represented traveling in the opposite direction in the other lane 46*a*.

As explained previously, the oncoming vehicle 48 is detected and the contours, the zone and the intensity of illumination are adjusted as a result: thus, as shown in FIG. 2, the illumination zone 42 is delimited by a contour 50 that complies with the various regulations in force. The illumination zone 42 comprises two sub-zones: a sub-zone 52 detected as being the sub-zone in which the oncoming vehicle 48 is located, and a complementary sub-zone 54 comprising the rest of the illumination zone 42, i.e. outside the sub-zone 52 where the oncoming vehicle 48 is located. These two sub-zones 52, 54 correspond to two different illuminations:

- in the sub-zone 52 where the oncoming vehicle 48 is located, the objective of the illumination is not to dazzle the driver of the oncoming vehicle 48 by complying with a variety of legislation. Thus, illumination is minimized in this sub-zone 52, in particular the intensity thereof is low, preferably zero. The sub-zone 52 is variable over time since it follows the progression of the oncoming vehicle 48 in the lane 46*a*, said progression being detected by the camera 36;
- in the complementary sub-zone 54, where the oncoming vehicle 48 is not located, the objective of the illumination is to allow maximum visibility for the driver 24. Thus, the illumination is increased in this complementary sub-zone 54 in such a manner as to enable the driver 24 to obtain an illumination close to that of high beam used, in particular, when no other vehicle is present on the road scene. In particular, if no oncoming vehicle is detected, the complementary sub-zone 54 covers all the illumination zone 42 and the illumination is identical to the illumination at high beam. This improvement in light level in the zone around the oncoming vehicle 48 thus diminishes the contrast between the dazzling originating from the oncoming vehicle 48 and the illuminated zone close to and around this oncoming vehicle 48.

By way of example, an embodiment of the formation of such an illumination zone 42 by a lighting device 22 is described in patent application EP 2 415 638.

Figure 3:
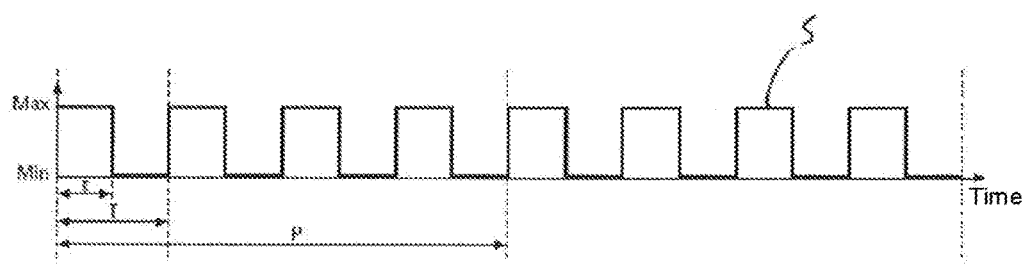
FIG. 3 is a time diagram representing a pulsed signal for controlling a lighting device of a vehicle equipped with a driving aid system according to an embodiment of the invention.

FIG. 3 shows a time diagram of the pulsed signal S for controlling a lighting device 22 of a vehicle equipped with a driving aid system according to an embodiment of the invention. In particular, this diagram is an example of the pulsed signal S that the control central unit 30 generates and then transmits on the one hand to the module 34 for managing the means for reducing dazzling and on the other to the lighting device 22 in order to control the latter, as described previously with reference to FIG. 1.

The pulsed signal S is a periodic signal, of period T, taking values between the high value Max and the low value Min. For a period T, the pulsed signal S takes the high value for a time t and the low value for a time T-t. The frequency f, of formula 1/T, is chosen to be sufficiently high to avoid any scintillation phenomenon for the driver 24 of the vehicle 20. The frequency f will, for example, be between 50 Hz and 600 Hz, preferably higher than 100 Hz, to benefit from the phenomenon of retinal persistence. The cyclic relationship, defined by the formula t/T, is in this case 0, 5, i.e. the pulsed signal S is at its high value for half the period T and at its low value for the other half of the period T. In the case of the equipment receiving the benchmark, this gives rise to:

- at the level of the obturators of the lenses of spectacles 28: the coefficient of transmission is high for half the time (over a time equal to a multiple of the period, for example P=4T in FIG. 3), and low for the other half of the time, which makes it possible to diminish the light perceived by the driver, in particular that originating from dazzling by the light originating from the illumination of the oncoming vehicle 48. The diminution in dazzling thus allows the reduction in contrast between the illuminated zone around and close to the oncoming vehicle and the light emitted by the oncoming vehicle 48, which may be dazzling;

at the level of the lighting device 22: the illumination intensity has a high value for half the time and a low value for the other half of the time, which brings the mean value of the illumination to the mean between the high value and the low value. Synchronization with the obturators makes it possible not to reduce the light level perceived by the driver 24 of the illumination of his own vehicle 20, while preserving a value of the mean illumination intensity in accordance with a variety of legislation. This illumination intensity applies only in the sub-zone 54 in which no oncoming vehicle is located, and the intensity may vary in the surrounding area from the high and low values as a function of the desired visibility.

The invention claimed is:

1. A motor vehicle driving aid system, a vehicle comprising a lighting device, intended to illuminate a road scene at a front of the vehicle, the vehicle further comprising means for detecting an oncoming vehicle, the aid system comprising:

control means receiving information from the detection means, means for reducing dazzling of a driver of the motor vehicle caused by light emitted by the oncoming vehicle, the means for reducing being controlled by the control means, means for managing the lighting device designed to increase the illumination of the lighting device of the vehicle and to avoid dazzling of the driver of the oncoming vehicle, the means for managing being controlled by the control means.

2. The aid system according to claim 1, wherein the lighting device is controlled by a pulsed signal generated by the control means, and in that the means for reducing dazzling comprise at least one means equipped with obturators controlled by said pulsed signal in synchronization with the lighting device.

3. The aid system according to claim 2, wherein the means equipped with obturators is a pair of spectacles and/or a windshield of said vehicle and/or a sun visor of said vehicle.

4. The aid system claim 2, wherein the obturators comprise liquid crystals, an orientation of which is modified by the pulsed signal.

5. The aid system according to claim 1, wherein the detection means are designed to detect presence and position of one or more oncoming vehicles, the control means adapting an illumination zone as a function of said presence and position of the oncoming vehicle so as not to dazzle the driver of the oncoming vehicle.

6. The aid system according to claim 1, wherein the detection means comprise a camera facing the exterior and toward the front of the vehicle.

7. The aid system according to claim 5, wherein, in the illumination zone, illumination is minimized in a sub-zone where the oncoming vehicle is located.

8. The aid system according to claim 7, wherein, in the illumination zone, illumination is increased outside the sub-zone where the oncoming or following vehicle is located.

9. The aid system as according to claim 1, wherein the lighting device comprises at least one light source of electroluminescent diode type.

10. A motor vehicle comprising the lighting device intended to illuminate a road scene at the front of the vehicle, the means for detecting an oncoming vehicle, and a driving aid system as claimed in claim 1.

11. The aid system according to claim 3, wherein the obturators comprise liquid crystals, an orientation of which is modified by the pulsed signal.

12. The aid system according to claim 11, wherein the detection means are designed to detect presence and position of one or more oncoming vehicles, the control means adapting an illumination zone as a function of said presence and position of the oncoming vehicle so as not to dazzle the driver of the oncoming vehicle.

13. The aid system according to claim 2, wherein the detection means are designed to detect presence and position of one or more oncoming vehicles, the control means adapting an illumination zone as a function of said presence and position of the oncoming vehicle so as not to dazzle the driver of the oncoming vehicle.

14. The aid system according to claim 3, wherein the detection means are designed to detect presence and position of one or more oncoming vehicles, the control means adapting an illumination zone as a function of said presence and position of the oncoming vehicle so as not to dazzle the driver of the oncoming vehicle.

15. The aid system according to claim 11, wherein the detection means comprise a camera facing the exterior and toward the front of the vehicle.

16. The aid system according to claim 2, wherein the detection means comprise a camera facing the exterior and toward the front of the vehicle.

17. The aid system according to claim 12, wherein, in the illumination zone, illumination is minimized in a sub-zone where the oncoming vehicle is located.

18. The aid system according to claim 17, wherein, in the illumination zone, illumination is increased outside the sub-zone where the oncoming or following vehicle is located.

19. The aid system as according to claim 11, wherein the lighting device comprises at least one light source of electroluminescent diode type.

20. A motor vehicle comprising the lighting device intended to illuminate a road scene at the front of the vehicle, the means for detecting an oncoming vehicle, and a driving aid system as claimed in claim 2.

* * * * *